(12) United States Patent
Brown

(10) Patent No.: US 8,950,784 B2
(45) Date of Patent: Feb. 10, 2015

(54) CONSIST COMMUNICATION SYSTEM

(75) Inventor: Dale A. Brown, LaGrange, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 46 days.

(21) Appl. No.: 13/485,479

(22) Filed: May 31, 2012

(65) Prior Publication Data

US 2013/0319563 A1 Dec. 5, 2013

(51) Int. Cl.
*B60D 1/62* (2006.01)

(52) U.S. Cl.
USPC .................. 285/68; 285/63; 701/19; 213/1.3; 213/1.6; 439/191; 439/194; 375/258

(58) Field of Classification Search
USPC ............. 285/67, 68, 69, 63; 701/19; 375/258; 213/1.3, 1.6; 439/194, 191
See application file for complete search history.

(56) References Cited

U.S. PATENT DOCUMENTS

| | | | | |
|---|---|---|---|---|
| 193,078 | A | * | 7/1877 | Eames ............................. 285/68 |
| 364,558 | A | * | 6/1887 | Wamsley et al. ............... 285/68 |
| 579,291 | A | * | 3/1897 | Cadott et al. .................... 285/68 |
| 896,854 | A | * | 8/1908 | Parsons ........................... 285/68 |
| 1,223,223 | A | * | 4/1917 | Tomlinson .................... 439/194 |
| 1,643,229 | A | * | 9/1927 | Sullivan et al. ................ 285/63 |
| 1,726,123 | A | * | 8/1929 | Rinehart et al. ................ 285/63 |
| 1,856,455 | A | * | 5/1932 | Banks et al. ................... 213/1.3 |
| 2,559,753 | A | * | 7/1951 | Birch et al. ..................... 285/63 |
| 2,614,209 | A | * | 10/1952 | Sorensen .......................... 246/8 |
| 2,634,311 | A | * | 4/1953 | Darling ......................... 439/191 |
| 2,883,069 | A | * | 4/1959 | Candlin, Jr. et al. ........... 213/1.3 |
| 3,381,977 | A | * | 5/1968 | Metzger .......................... 285/63 |
| 3,523,266 | A | * | 8/1970 | King et al. ...................... 285/68 |
| 3,552,580 | A | * | 1/1971 | Cope .............................. 213/1.3 |
| 3,649,949 | A | * | 3/1972 | McCarthy et al. ............ 439/194 |
| 3,842,987 | A | | 10/1974 | Prada |
| 4,183,599 | A | * | 1/1980 | Wetzig ............................ 285/68 |
| 4,303,301 | A | | 12/1981 | Teichert et al. |
| 4,682,144 | A | | 7/1987 | Ochiai et al. |
| 5,480,042 | A | | 1/1996 | Engle |
| 5,586,668 | A | * | 12/1996 | Miller ............................ 213/1.3 |
| 5,734,989 | A | | 3/1998 | Woodcock |

(Continued)

FOREIGN PATENT DOCUMENTS

WO    WO 2009/021025    2/2009

OTHER PUBLICATIONS

International Search Report, PCT/US2008/072315.

*Primary Examiner* — David E Bochna
(74) *Attorney, Agent, or Firm* — Finnegan, Henderson, Farabow, Garrett & Dunner LLP

(57) ABSTRACT

A communication system is disclosed for use with a train consist. The consist communication system may have a first fluid conduit, a first coupling connected to the first fluid conduit, a first cover connected to the first coupling and configured to close an end of the first fluid conduit, and at least a first cable disposed within the first fluid conduit. The system may also have a second fluid conduit substantially identical to the first fluid conduit, a second coupling substantially identical to the first coupling, fixedly connected to the second fluid conduit, and connectable to the first coupling, and a second cover connected to the second coupling and configured to close an end of the second fluid conduit. At least a second cable may be disposed within the second fluid conduit in communication with the at least a first cable through the first and second covers. The first and second fluid conduits may be pressurized.

20 Claims, 5 Drawing Sheets

(56) References Cited

U.S. PATENT DOCUMENTS

| | | | |
|---|---|---|---|
| 5,865,329 A * | 2/1999 | Gay et al. .................. 213/1.3 |
| 6,173,849 B1 | 1/2001 | Stevens et al. |
| 6,264,048 B1 | 7/2001 | Ramnialis et al. |
| 6,705,478 B1 * | 3/2004 | Engle .................. 213/1.3 |
| 6,959,825 B2 | 11/2005 | Uneme et al. |
| 7,070,062 B2 * | 7/2006 | Trescott .................. 213/1.3 |
| 7,726,993 B2 | 6/2010 | Simeon et al. |
| 2002/0050698 A1 | 5/2002 | Dippenaar |

* cited by examiner

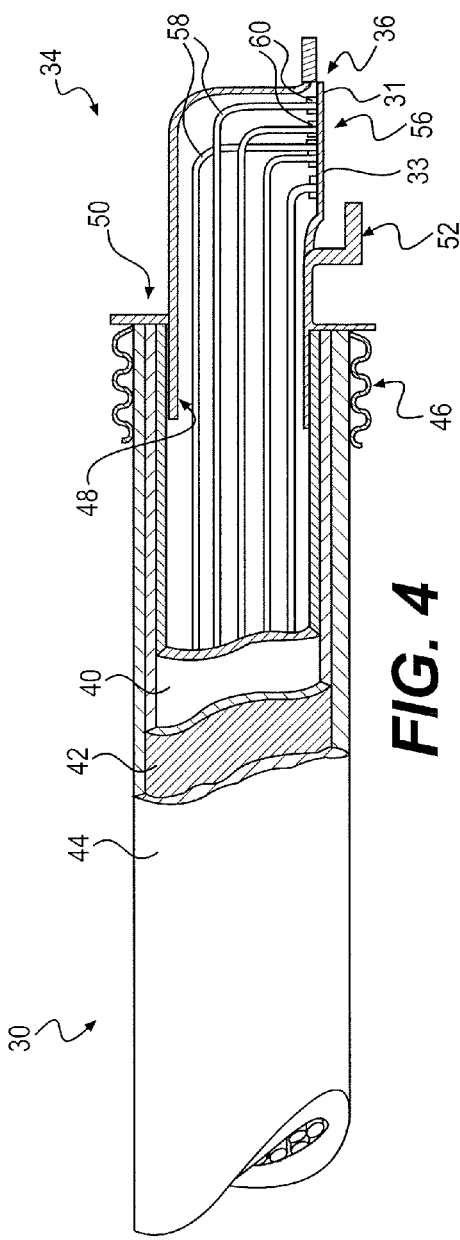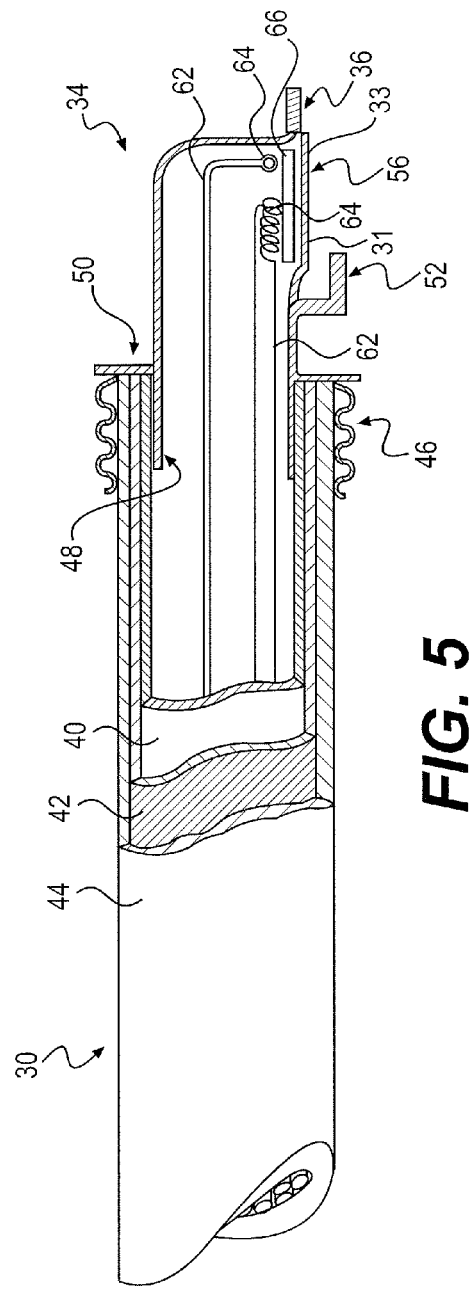

CONSIST COMMUNICATION SYSTEM

TECHNICAL FIELD

The present disclosure relates generally to a communication system and, more particularly, to a communication system for use with a train consist.

BACKGROUND

A train consist is a group of rail vehicles that make up a train. In most consists, the group of rail vehicles includes at least one locomotive (often more than one), one or more freight or passenger vehicles, and, in some applications, a caboose. The locomotive(s), although generally located at the leading end of the consist, can alternatively be located at any other position along its length. The locomotive provides power to the rest of the consist and the lead locomotive generates operator- and/or autonomous control commands directed to components of the locomotive and to other vehicles in the consist (e.g., traction commands, braking commands, destination commands, etc.). The caboose, if present, is generally located at the trailing end of the consist. In some embodiments, control commands can also or alternatively be generated within the caboose and directed to one or more other vehicles in the consist.

Communication within a train consist can involve a range of technologies. For example, power between vehicles can be transmitted via hard-wired pinned connections. Control commands (e.g., traction commands between multiple locomotives) can be facilitated wirelessly (e.g., via shortwave radio signals). Other ways of communicating power and data between vehicles have also been utilized.

Although functional, each of the communication technologies described above may have drawbacks. For example, it may be possible for hard-wired pinned connections to be insufficiently coupled or coupled incorrectly, and/or for components of the connections to fail during use (e.g., pins in the connection can break). Wireless communication can be insecure and prone to interference from outside sources. These difficulties increase as a size of the consist increases, while at the same time, the importance of accurate and reliable communication also increases.

One attempt to improve communication between vehicles in a consist is disclosed in U.S. Pat. No. 5,917,632 that issued to Lesesky et al. on Jun. 29, 1999 ("the '632 patent"). In particular, the '632 patent discloses using proven, conventional, "glad-hand" connectors normally associated with a brake hose conduit to simultaneously pass pressurized air to brakes of the consist and to communicate data associated with the brakes. The glad-hand connectors are fitted with lenses and data communicators disposed within each of the lenses. The data communicators communicate with each other through the lenses. The lenses each include sloping upper surfaces that allow pressurized air from an associated inlet air hose to flow past the lenses to an associated outlet hose.

Although the system of the '632 patent may have improved reliability and durability through the use of proven conventional connectors, the system may still be problematic. In particular, the connectors may be prone to debris ingress when uncoupled, which can reduce communication accuracy. In addition, the lenses being located within a flow path of pressurized brake air could restrict the flow of air to an undesired level. Further, the system of the '632 patent requires the addition of communication conduits outside of the brake hose conduits, which can reduce the durability of the system.

The consist communication system of the present disclosure solves one or more of the problems set forth above and/or other problems in the art.

SUMMARY

In one aspect, the present disclosure relates to a consist communication system. The consist communication system may include a first fluid conduit, a first coupling fixedly connected to the first fluid conduit, and a first cover connected to the first coupling and configured to close off an end of the first fluid conduit. At least a first cable may be disposed within the first fluid conduit. The system may further include a second fluid conduit substantially identical to the first fluid conduit, a second coupling substantially identical to the first coupling, fixedly connected to the second fluid conduit, and connectable to the first coupling, and a second cover connected to the second coupling and configured to close off an end of the second fluid conduit. At least a second cable may be disposed within the second fluid conduit in communication with the at least a first cable through the first and second covers. The first and second fluid conduits may be pressurized.

In another aspect, the present disclosure may be related to a consist communication system including a first fluid conduit operatively connectable to a first rail vehicle, a first coupling fixedly connected to the first fluid conduit, and at least a first cable disposed within the first fluid conduit. The consist communication system may further include a second fluid conduit that is substantially identical to the first fluid conduit and operatively connectable to a second rail vehicle, a second coupling substantially identical to the first coupling, fixedly connected to the second fluid conduit, and connectable to the first coupling, and at least a second cable disposed within the second fluid conduit in communication with the at least a first cable. Additionally, the consist communication system may include a third fluid conduit that is substantially identical to the first and second fluid conduits and operatively connectable to a brake of the first rail vehicle, and a third coupling substantially identical to the first and second fluid couplings and fixedly connected to the third fluid conduit. The consist communication system may also include a fourth fluid conduit that is substantially identical to the first, second, and third fluid conduits and operatively connectable to a fluid supply of the second rail vehicle, and a fourth coupling substantially identical to the first, second, and third fluid couplings, fixedly connected to the fourth fluid conduit, and connectable to the third coupling. The first and second fluid conduits may be spaced apart to inhibit coupling of the first or second fluid conduits with the third or fourth fluid conduits.

BRIEF DESCRIPTION OF THE DRAWINGS

FIGS. 4 and 5 are partial cross-sectional illustrations of exemplary disclosed communication conduits that may be used in conjunction with the consist communication system of FIG. 1.

DETAILED DESCRIPTION

Figure 1:
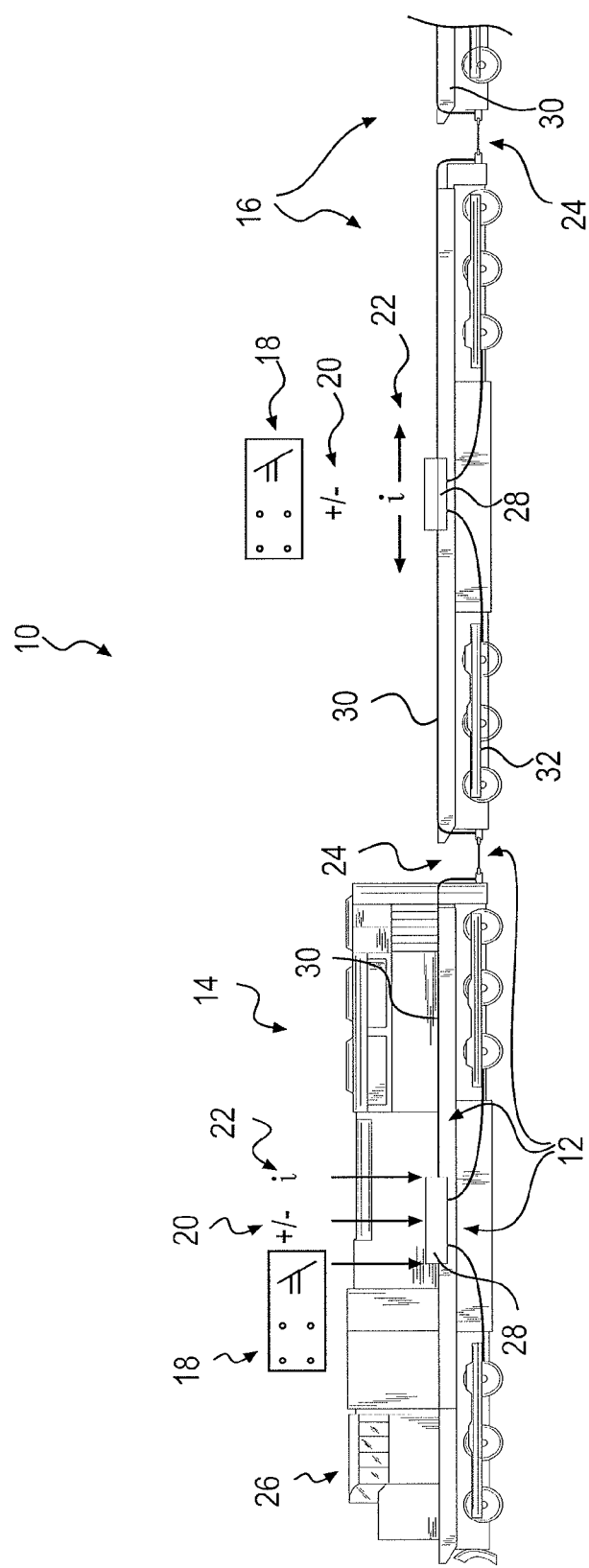
FIG. 1 is a diagrammatic illustration of an exemplary disclosed consist communication system.

FIG. 1 illustrates an exemplary embodiment of a consist 10 having a communication system 12. Consist 10 is depicted and described as being associated with railway transportation and includes a single locomotive 14 and one or more trailing consist vehicles 16. It is contemplated that, as there may often be multiple locomotives 14 involved in a single consist 10, locomotives 14 may be placed at various locations along consist 10. Locomotive 14 of FIG. 1 may be the lead vehicle in the depicted consist 10, and a source of controls 18, power 20 (+/−), and data 22 (i) for consist 10. Alternatively or additionally, controls 18, power 20, and data 22 of consist 10 may be sourced from trailing consist vehicles 16, if desired. Consist communication system 12 may be utilized to monitor and control locomotive(s) 14 and consist vehicles 16.

As shown in FIG. 1, the various consist vehicles 16 may share connections 24, of which there may be multiple types. One type of consist vehicle connection 24 may be a mechanical connection between bogies (a.k.a. trucks), the chassis or frameworks of consist vehicles 16. The bogies may be comprised of wheels, axels, and braking and suspension systems. Consist vehicles 16 may mount multiple bogies at a time. Couplers, which may be located at the ends of bogies, may connect the bogies to each other. Another means of connecting consist vehicles 16 along consist 10 may include electronic connections, such that electrical power, control commands, and data signals may be transmitted to and from each consist vehicle 16. Fluid connections may also be made along consist 10, such that pneumatically and hydraulically powered features (e.g., brakes) may extend the length of consist 10. The various connections 24 along consist 10 may be monitored by a consist operator and/or monitored autonomously by consist communication system 12.

Consist 10 may require operator control. The operator may control consist 10 through an interface (not shown) found in an operator station 26 of locomotive 14. The operator interface may include one or more controllable devices that are electronically linked to an electronic control module (controller) 28. Controller 28 may be configured to control other consist vehicle components based on operator command signals and may be further configured to generate diagnostic signals directed to controllers 28 of other consist vehicles 16. Controller 28 may embody a single microprocessor or multiple microprocessors that include a means for monitoring and controlling operations of consist 10. Numerous commercially available microprocessors can be configured to perform the functions of controller 28. Controller 28 may include all the components required to run an application such as, for example, a memory, a secondary storage device, and a processor, such as a central processing unit, or any other means known in the art for monitoring and controlling consist 10.

Monitoring consist 10 may be accomplished via sensors (not shown), which may be placed at various select locations along consist 10. Changes in physical phenomena such as, but not limited to, light, liquid level, fluid flow, proximity, temperature, angular speed, displacement, and pressure may produce changes in the voltages, currents, resistances, capacitances, or inductances of the sensors. These changes in the voltages, currents, resistances, capacitances, or inductances at the sensors may be conditioned, amplified and routed to controller 28 via consist communication system 12. Controller 28 may then utilize stored algorithms, equations, subroutines, look-up maps and/or tables to analyze the operational condition data of consist 10, and may exercise autonomous pre-configured control over various elements of consist 10 and/or may provide data to the operator interface for operator assessment and control.

Various known circuits may be associated with controller 28, including power supply circuitry, signal-conditioning circuitry, solenoid driver circuitry, communication circuitry, and other appropriate circuitry. Controller 28 may receive signals from and send signals to both the operator interface and various components of the consist including other controllers 28 in consist 10. In such an arrangement, consist communication system 12 may enable all controllers 28, and components associated with controller 28, to operate in tandem; controlling various operations, e.g., braking and, traction-type operations.

Whether or not every consist vehicle 16 has a controller 28, or means to generate and/or analyze data or run diagnostics, each consist vehicle 16 may be able to receive and transmit power as well as data and control signals through consist communication system 12. It is contemplated that consist communication system 12 may include a plurality of cables for this purpose. The cables may include a power transmission cable, a control cable and a data cable. It is contemplated that the cables may further include a redundant power transmission cable, a redundant control cable and a redundant data cable, if desired. The data cables may be twisted pair or coaxial cables made of copper or fiber optics. Electro-magnetic cables may also be used to transmit power, control and/or data signals. The power, data and control cabling of consist communication system 12, along with any redundant sets of the same, may be housed and protected within a fluid conduit 30.

It is contemplated that some or all of fluid conduits 30 may be filled with compressed air or another inert gas. The air may be compressed at a pressure source located at, for example, locomotive 14 or another location along consist 10. The compressed air in fluid conduit 30 may help prevent ingress of debris and water. It is further contemplated that fluid conduit 30 may be filled with oil or other non-gas fluid, which may be used to hydraulically affect mechanical motion at brakes 32 or other areas of consist 10. The flow in fluid conduit 30 may be relatively stagnant under normal operating conditions. Fluid conduit 30 may be a contiguous conduit extending the distance of consist 10 via connections 24 in-between consist vehicles 16.

Figure 2:
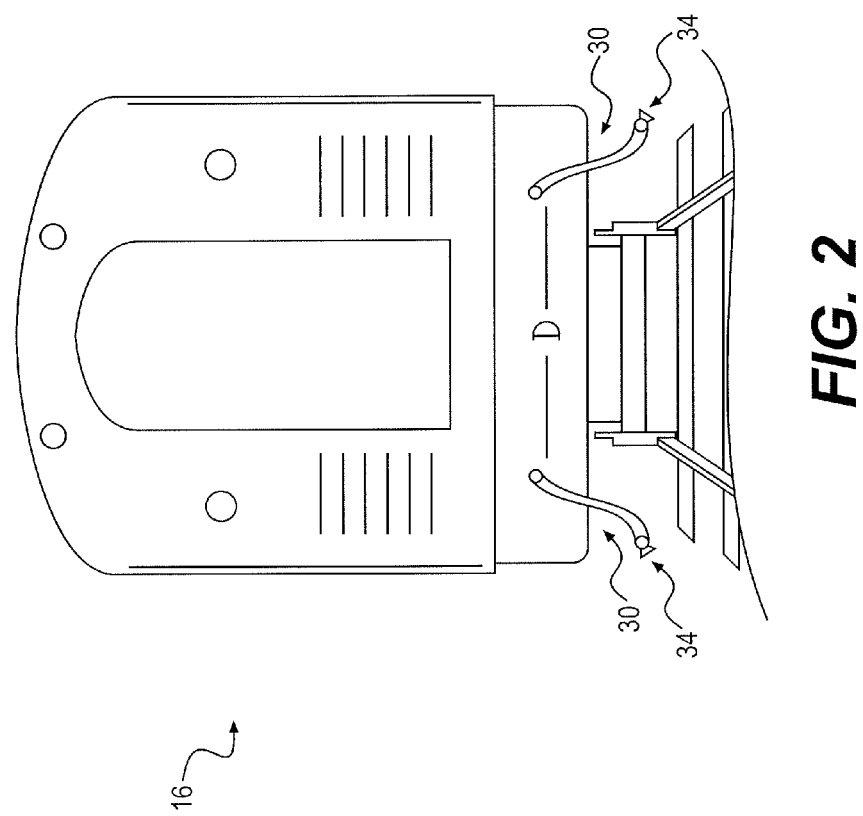
FIG. 2 is a pictorial illustration of a consist vehicle equipped with the consist communication system of FIG. 1.

FIG. 2 illustrates how fluid hoses and data, control and power cables can be connected between consist vehicles 16, with an end view of an exemplary consist vehicle 16. Two or more fluid conduits 30 may extend from an end of each consist vehicle 16, and may be connected with similar fluid conduits 30 associated with an adjacent consist vehicle 16. One fluid conduit 30 may serve as the air hose for the consist air brake system, while the other fluid conduit 30 may serve as a communication conduit for consist communication system 12. For example, fluid conduit 30 located on the starboard side of consist vehicle 16 may serve as the air hose, and conduit 30 located on the port side may serve as the communication conduit. Yard hostlers, who prepare train consists for travel, may connect fluid conduits 30 of one consist vehicle 16 with corresponding fluid conduits 30 on the adjacent consist vehicle 16. Starboard and port side fluid conduits 30 may be separated from each other on consist vehicle 16 by a distance D greater than the combined length of connected or paired fluid conduits 30. Given the length of distance D separating the starboard and port side fluid conduits 30, it may be difficult (if not impossible) for the yard hostlers to make inappropriate connections of fluid conduits 30. Connections of fluid conduit 30 may be made with a wide variety of couplers and connectors found in the industry.

Figure 3:
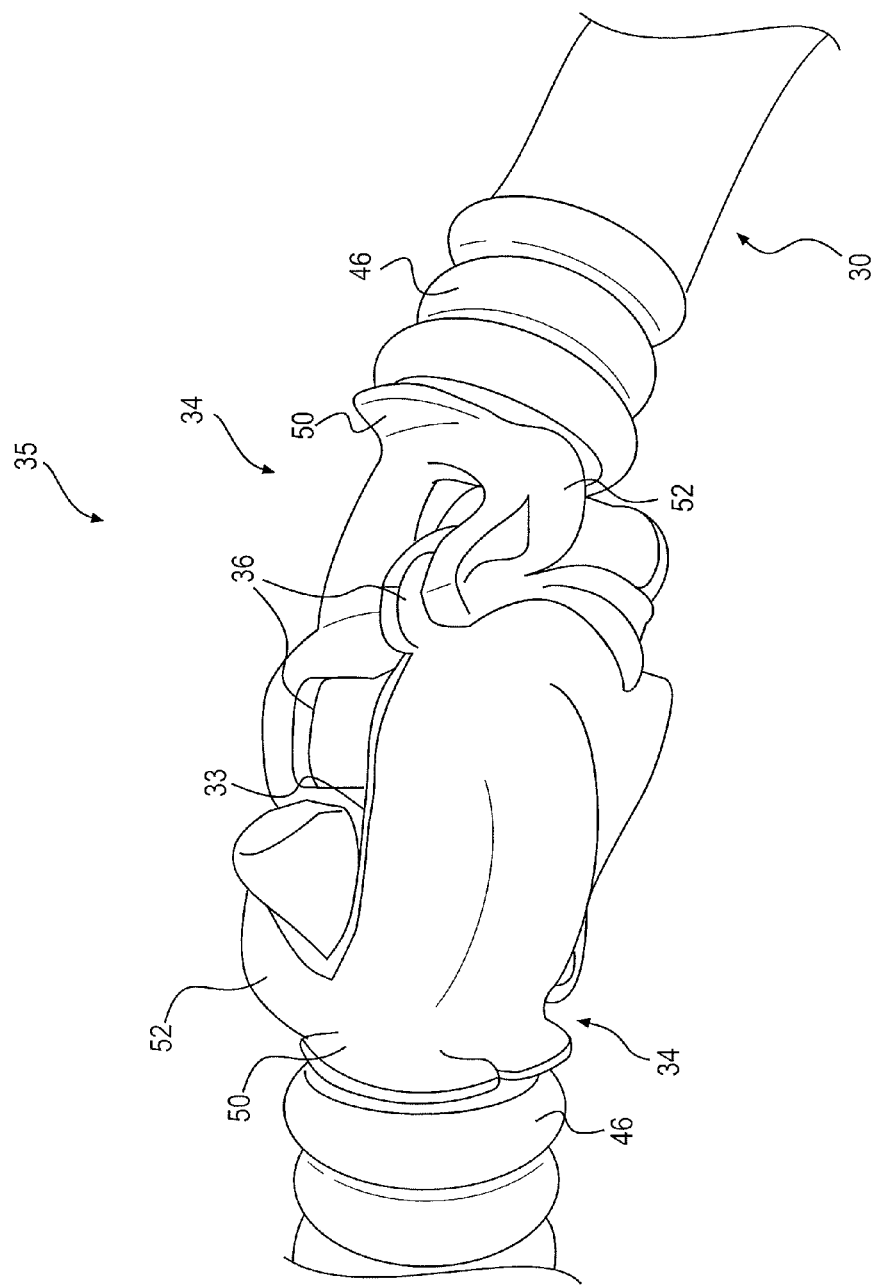
FIG. 3 is a pictorial illustration of an exemplary disclosed coupling that may be used in conjunction with the consist communication system of FIG. 1.

One example of a time-proven and reliable coupling used to connect fluid conduits 30 is a glad-hand coupling 35. As shown in FIG. 3, glad-hand coupling 35 is made up of two glad-hand connectors 34. Glad-hand connectors 34 may each have a pair of retaining tabs 36 surrounding a generally flat engaging face 33. Faces 33 of paired glad-hand connectors 34 may be placed together, and one or both of the glad-hand connectors 34 may be rotated such that retaining tabs 36 engage each other in a snap-lock position. Glad-hand coupling 35 may provide a secure connection, while allowing for a clean break-away of glad-hand connectors 34, (i.e., without damaging glad-hand connectors 34), if consist vehicles 16 are separated without first uncoupling glad-hand connectors 34. Glad-hand connectors 34 may be equipped with seals 31 which engage face 33, and may help prevent fluid from escaping fluid conduit 30. Additionally, seals 31 may inhibit the ingress of water or debris into fluid conduit 30.

In addition to preventing the ingress of water and debris and the loss of pressure in fluid conduit 30, it may also be important to safeguard components of consist communication system 12 housed within fluid conduit 30 from environmental conditions. FIGS. 4 and 5 illustrate one possible embodiment of fluid conduit 30 having multiple and various layers of material. For example, fluid conduit 30 may include an inner tube 40, a fabric reinforcement 42 and an outer cover 44. Inner tube 40 may be made from a synthetic elastomer that is configured to come in contact with fluid, filler, cabling and other elements that constitute consist communication system 12. Fabric reinforcement 42 may overlay inner tube 40 and include, for example, a multi-ply, polyester material. Fluid conduit 30 may further have a steel wire braid reinforcement (not shown) in conjunction with fabric reinforcement 42, if desired. An oil, weather and abrasion resistant outer cover 44 made from a synthetic elastomer may encase the aforementioned two layers. The range of operating temperatures of fluid conduit 30 may be about −55° F. to +176° F. (−50° C. to +80° C.). The diameter of fluid conduit 30 may range between about 2.063 and 2.125 inches for the outer diameter and between about 1.375 and 1.434 inches for the interior diameter. The maximum operating pressure of fluid conduit 30 may be about 140 psi. The minimum burst pressure may be about 1000 psi. The minimum pull-off force may be about 2,900 lbs. The minimum bend radius of fluid conduit 30 may be about 9.0 inches. Fluid conduit 30 may be a rugged, and consequentially, long-term means of housing and protecting consist communication system 12.

As shown in FIGS. 4 and 5, glad-hand connectors 34 may include elements that connect to and seal the end of fluid conduit 30. Some of these elements may include, for example, a nipple 48, a flange 50, an interlocking fitting 52, and a retention member 46. Nipple 48 may be inserted inside fluid conduit 30 (i.e., inside inner tube 40) until flange 50 abuts a distal end of fluid conduit 30. Interlocking fitting 52 may extend from flange 50 toward face 33. Retaining tab 36 may protrude away from flange 50 and be configured to retain interlocking fitting 52 of an adjoining glad-hand connector 34 upon coupling. Retention member 46 may be attached to flange 50 and configured to engage outer cover 44 to provide an opportunity to tighten or loosen the attachment of glad-hand connector 34 with fluid conduit 30. In addition to providing a pressurized contiguous conduit generally free of debris and water, glad-hand connector 34 may bring data, control and power cables from adjoining fluid conduits 30 into alignment with each other.

In the embodiment of FIG. 4, a plurality of fiber optic cables 58 are held in a fixed alignment within gland-hand connector 34. A cover 56 of glad-hand connector 34 may isolate and seal fiber optic cables 58 from the external environment when glad-hand connector 34 is uncoupled. Cover 56 may be made of a substantially translucent material or otherwise be a lens, through which fiber optic cables 58 receive and transmit data signals to corresponding fiber optic cables 58 in an adjoining glad-hand connector 34. Furthermore, cover 56 may condense and condition the signals passing therethrough. One or more fiber optic attachment mechanisms 60 may function to position and maintain a consistent alignment of fiber optic cables 58. In addition to or in the place of attachment mechanisms 60, a filler material (e.g., a foam material) may be placed within glad-hand connector 34 to maintain a fixed arrangement of fiber optic cables 58.

FIG. 5 provides an alternative embodiment of fluid conduit 30 having non-contact electro-magnetic cables 62. Cables 62 may be used to transmit data, control commands, and/or electrical power. Data, control commands, and power may be transmitted from one glad-hand connector 34 to another adjoining glad-hand connector 34 via inductance at one or more transformer coils 64. To reduce eddy-current loss, transformer coils 64 may be wound on a common core that consists of laminated iron. Transformer coils 64 may step up or step down the voltage from one glad-hand connector 34 to another along fluid conduit 30. It is contemplated that coils 64 located within a particular glad-hand connector 34 may be oriented orthogonally relative to each other, so as to reduce inductive interference that each may experience on account of the other. It is further contemplated that power and data cables may function at different frequencies as an additional measure to reduce inductive interference. For example, the power transmission cable may operate with a frequency of about 1 MHz, whereas the data and control cables may operate at frequencies of about 10 MHz. A signal conditioner 66 and its associated electronics may be disposed between an end fluid conduit 30 and cover 56 and may be associated with cables 62. Signal conditioner 66 may perform many functions, some of which include amplification of sensor signals; conversion of currents to voltages; supply of (ac or dc) excitations to sensors such that changes in resistance, inductance, or capacitance may be converted to changes in voltage; and signal filtering to eliminate noise or other unwanted signal components. Signal conditioner 66 may or may not be specific to a particular application. Transformer coils 64 and signal conditioner 66 may be encased in rubber or an epoxy-based material. Cover 56 (described above) of glad-hand connector 34 may isolate and seal cables 62 and signal conditioner 66 from the external environment when glad-hand connector 34 is uncoupled.

Figure 6:
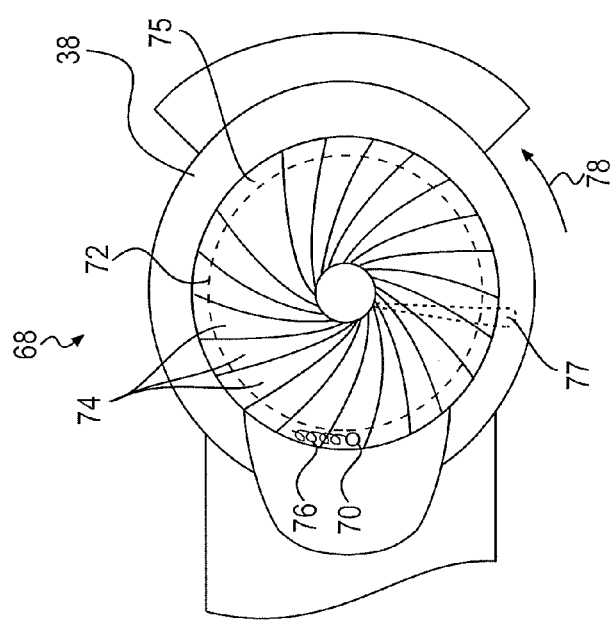

In some applications, it may be desirable to have a means to protect and conceal cover 56 from external hazards when glad-hand connector 34 is uncoupled. FIG. 6 illustrates one way to conceal and protect cover 56. In particular, an iris gate 68 may be employed as a closure mechanism to shield cover 56 when the associated glad-hand connector 34 is disconnected from its adjoining glad-hand connector 34. Iris gate 68 may be comprised of multiple components, some of which include a plurality of leaves 74, an actuator ring 72, an engaging protrusion (e.g., an indexing pin 70), and a spring 76. Leaves 74 may each be connected on one end to a pivot point 75 on actuator ring 72, and connected on their opposite end to a pivot point 77 on glad-hand connector 34. Upon coupling of glad-hand connector 34 with an adjoining glad-hand connector 34, indexing pin 70 may be engaged and moved (for example, in direction 78) by adjoining glad-hand connector 34. Indexing pin 70 may be utilized to transfer the coupling motion to rotational motion of actuator ring 72. As actuator ring 72 is rotated, pivot points 75 of leaves 74 may move relative to pivot points 77 on glad-hand connector 34. As actuator ring 72 rotates in a coupling direction, iris gate 68 may open to reveal ends of fluid conduits 30 and associated communication elements of cables within fluid conduits 30. Upon reverse rotation of actuator ring 72, during disengagement of glad-hand connector 34 with an adjoining glad-hand connector 34, iris gate 68 may close. Actuator ring 72 may be connected to a spring 76, which may bias ring 72, and subsequently iris gate 68, to a closed position. Opening and closing of iris gates 68 in both glad-hand connectors 34 may be designed to occur coincidentally during coupling.

Figure 7:
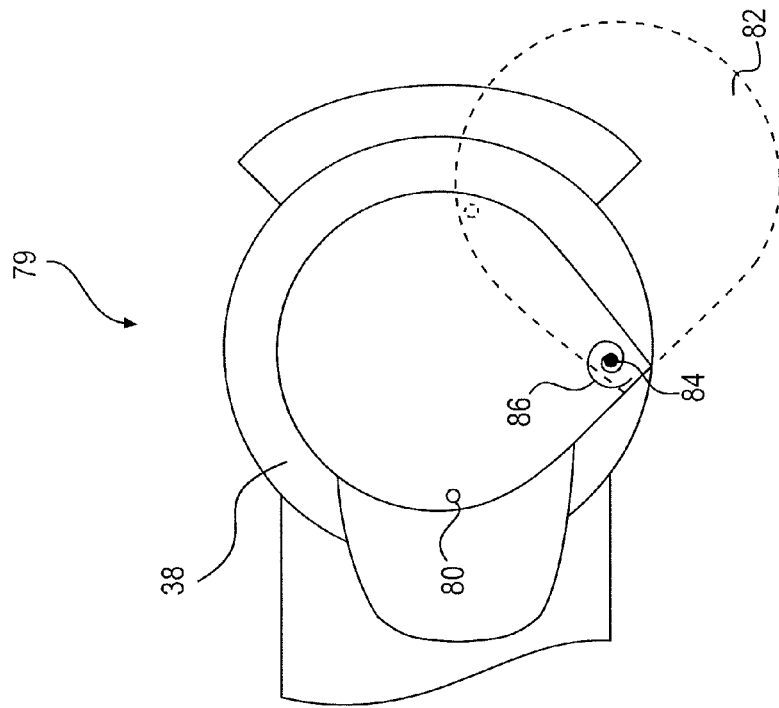
FIGS. 6 and 7 are diagrammatic illustrations of exemplary disclosed closure-mechanisms that may be used in conjunction with the communication conduits of FIGS. 3 and 4.

FIG. 7 illustrates an alternative way to protect cover 56. Specifically, a pivotal gate 79 may be employed to shield cover 56 as a closure mechanism when glad-hand connector 34 is disconnected from its adjoining glad-hand connector 34. Pivotal gate 79 may be comprised of multiple components, some of which include a gate 82, a pivot point 84, an engaging protrusion (e.g., an indexing pin 80), and a spring 86. Upon coupling of the associated glad-hand connector 34 with an adjoining glad-hand connector 34, indexing pin 80 may be engaged by adjoining glad-hand connector 34. Indexing pin 80 may be utilized to transfer the rotational coupling motion to rotational motion of gate 82 about pivot point 84. As glad-hand connector 34 rotationally engages glad-hand connector 34, gate 82 may swing to an open position. As glad-hand connector 34 rotationally disengages from the adjoining glad-hand connector 34, gate cover 82 may swing the opposite direction to a closed position. Gate 82 may be connected to spring 86, which may bias gate 82 to the closed position. Opening and closing of similar pivotal gates 79 in both glad-hand connectors 34 may be designed to occur coincidentally.

Industrial Applicability

The disclosed consist communication system may be used with any rail or non-rail transportation system where a reliable, accurate, durable and secure means of transmitting power, command controls, and data signals along a consist is desired. It is contemplated that the presently disclosed consist 10 and consist communication system 12 may be utilized with any number of vehicles and/or different types of vehicles in various arrangements. For example, consist 10 could include additional locomotives, passenger cars, freight cars, tanker cars, etc. Additionally, it is contemplated that consist 10 may apply to non-rail transportation systems, e.g., commercial delivery trucks, recreational vehicles, tractors/trailers and other modes of transportation and freight delivery, as desired.

The longer the consist, the more important it may be that data, control commands, and power are effectively relayed and maintained along the length of the linked consist. The disclosed consist communication system may provide a rugged and low-maintenance means for delivering and protecting consist communication system 12 along consist 10 through use of proven components. The disclosed consist communication system may have reduced ingress of debris and water into fluid line connectors, when the connectors are uncoupled, by covering the ends of the consist fluid conduit during uncoupling. The operation of consist communication system 12 will now be described with reference to FIGS. 1 through 7.

While preparing a consist for operation, yard hostlers may connect multiple and various fluid conduits 30 along consist 10 at inter-vehicle connections 24. Hostlers may connect fluid conduits 30 associated with consist communication system 12 with corresponding fluid conduits 30. In similar fashion, hostlers may connect pairs of fluid conduits 30 associated with pneumatically or hydraulically controlled systems. As the various fluid conduits 30 associated with consist 10 may appear to be identical and present a risk of being mismatched, they may be positioned on consist 10 in such a way that they are separated from each other by a distance D that may exceed the length of mismatched fluid conduits. For example, distance D may be such that a fluid conduit 30 associated with consist communication system 12 may not be able to be inadvertently coupled with a fluid conduit 30 associated with the air brake system. Hostlers may make the connections by engaging couplers 35. Upon coupler engagement, covers 68 and 79 within couplers 35 may open, and power, data and control cables may be aligned in such a way so as to establish a fluid communication path.

Operation of consist 10 may be monitored and/or controlled through consist communication system 12 autonomously by controller 28 and/or manually by an operator via an operator interface (not shown) that may be found in operator station 26. During operation of consist 10, controller 28 may digitally communicate and coordinate with other controllers 28 and other components of consist 10. Sensors located along consist 10 may alert controller 28 and/or the consist operator of changes to various physical phenomena at any point along consist 10. Such changes may include changes to temperatures, angular speeds, displacements or pressures. Data communication along consist 10 may be accomplished via fiber optic cables 58 and/or electro-magnetic cables 62. Cables 58 and 62 may be housed within fluid conduit 30.

Fluid conduit 30 may be similar to other fluid conduits common in the industry in its constitution and installation. Consequently, the installation and maintenance of fluid conduit 30 may not require unique and/or additional instrumentation, training or skill. Additionally, as fluid conduit 30 may be similar in constitution and installation to other fluid conduits in the industry it may therefore be a durable apparatus designed to withstand the harsh operating conditions and potentially inclement environments which may be common to consist 10.

Glad-hand connectors 34 may likewise be common in the industry and may similarly provide a reliable, familiar and durable means for connecting fluid conduits 30 along consist 10. Glad-hand connectors 34 may be designed in such a way so as to align the data, control and power cables, therein disposed, with those disposed within an adjoining glad-hand connector 34 during glad-hand coupling. Glad-hand connectors 34 are designed to withstand frequent engagement and disengagement. Additionally, data and power coils 64 may be arranged within glad-hand connectors 34 in such a manner so as to reduce inductive interference that each may experience on account of each other.

To prevent the ingress of water and/or debris, which may deleteriously affect the accuracy and longevity of consist communication system 12, gates 68 and 79 may protect cover 56 from damage when glad-hand connectors 34 are uncoupled. Gates 68 and 79 may further provide additional protection to other components of consist communication system 12 disposed within fluid conduit 30 and glad-hand connector 34. Additionally, fluid conduit 30 may be pressurized so as to further prevent the ingress of water and/or debris during consist 10 travel and engagement and disengagement of couplers 34.

Given their durable constitution, common-to-the-industry installation and maintenance, and means of protecting against external hazards, fluid conduit 30 and glad-hand connectors 34 may comprise a cost-effective and long-lasting means of routing, facilitating and protecting consist communication system 12 for a number of consist-related situations.

It will be apparent to those skilled in the art that various modifications and variations can be made to the disclosed consist communication system without departing from the scope of the disclosure. Other embodiments of the consist communication system will be apparent to those skilled in the art from consideration of the specification and practice of the consist communication system disclosed herein. It is intended that the specification and examples be considered as exemplary only, with a true scope of the disclosure being indicated by the following claims and their equivalents.

What is claimed is:

1. A consist communication system, comprising:
a first fluid conduit;
a first coupling fixedly connected to the first fluid conduit;
a first cover connected to the first coupling and configured to close off an end of the first coupling;
at least a first cable disposed within the first fluid conduit;
a second fluid conduit substantially identical to the first fluid conduit;
a second coupling substantially identical to the first coupling, fixedly connected to the second fluid conduit, and connectable to the first coupling;
a second cover connected to the second coupling and configured to close off an end of the second coupling; and,
at least a second cable disposed within the second fluid conduit in communication with the at least a first cable through the first and second covers,
wherein the first and second fluid conduits are pressurized.

2. The consist communication system of claim 1, wherein the first and second couplings are glad-hand connectors.

3. The consist communication system of claim 1, wherein the at least a first cable includes at least three cables disposed within the first fluid conduit.

4. The consist communication system of claim 3, wherein the at least three cables include at least a power transmission cable, a control cable, and a data cable.

5. The consist communication system of claim 4, wherein the at least three cables further include at least a redundant power transmission cable, a redundant control cable, and a redundant data cable.

6. The consist communication system of claim 4, wherein the data cable includes an optical fiber.

7. The consist communication system of claim 6, wherein the optical fiber is secured in a fixed arrangement within the first fluid conduit with a filler material.

8. The consist communication system of claim 1, wherein the first and second covers are lenses configured to condition signals from the at least a first and at least a second cables.

9. The consist communication system of claim 1, further including a transformer associated with the at least first cable and configured to inductively transmit electrical current.

10. The consist communication system of claim 1, further including signal conditioning electronics disposed between the first fluid conduit and the first cover.

11. The consist communication system of claim 1, further including a controller configured to control consist vehicle components based on command signals transmitted via the at least a first cable.

12. The consist communication system of claim 11, wherein the controller is further configured to generate diagnostic signals directed to controllers of other consist vehicles.

13. A consist communication system, comprising:
a first fluid conduit operatively connectable to a first rail vehicle;
a first coupling fixedly connected to the first fluid conduit;
a first cover connected to the first coupling and configured to close off an end of the first coupling;
at least a first cable disposed within the first fluid conduit;
a second fluid conduit substantially identical to the first fluid conduit and operatively connectable to a second rail vehicle;
a second coupling substantially identical to the first coupling, fixedly connected to the second fluid conduit, and connectable to the first coupling;
a second cover connected to the second coupling and configured to close off an end of the second coupling;
at least a second cable disposed within the second fluid conduit in communication with the at least a first cable through the first and second covers;
a third fluid conduit substantially identical to the first and second fluid conduits and operatively connectable to a brake of the first rail vehicle;
a third coupling substantially identical to the first and second fluid couplings and fixedly connected to the third fluid conduit;
a fourth fluid conduit substantially identical to the first, second, and third fluid conduits and operatively connectable to a fluid supply of the second rail vehicle; and,
a fourth coupling substantially identical to the first, second, and third fluid couplings, fixedly connected to the fourth fluid conduit, and connectable to the third coupling,
wherein the first and second fluid conduits are spaced apart to inhibit coupling of the first or second fluid conduits with the third or fourth fluid conduits.

14. The consist communication system of claim 13, wherein the first and second fluid conduits are spaced apart from the third and fourth fluid conduits by a distance greater than the combined lengths of the first and third, first and fourth, second and third, and second and fourth fluid conduits.

15. The consist communication system of claim 13, further including a pressure source, wherein the first, second, third and fourth fluid conduits are in fluid communication with the pressure source.

16. The consist communication system of claim 13, wherein the first and second fluid conduits have stagnant fluid flow during normal operation.

17. The consist communication system of claim 13, wherein the at least first cable includes at least three cables disposed within the at least first fluid conduit.

18. The consist communication system of claim 17, wherein the at least three cables include at least a power transmission cable, a control cable and a data cable.

19. The consist communication system of claim 13, further including a controller configured to control consist vehicle components based on command signals transmitted via the at least a first cable.

20. A train consist, comprising:
a first rail vehicle;
a second rail vehicle mechanically coupled to the first rail vehicle;
a first fluid conduit operatively connected to the first rail vehicle;
a first coupling fixedly connected to the first fluid conduit;
a first cover connected to the first coupling and configured to seal off an end of the first coupling;
at least a first cable disposed within the first fluid conduit;
a second fluid conduit substantially identical to the first fluid conduit and operatively connected to the first rail vehicle;
a second coupling substantially identical to the first coupling, fixedly connected to the second fluid conduit, and connectable to the first coupling;

a second cover connected to the second coupling and configured to seal off an end of the second coupling;

at least a second cable disposed within the second fluid conduit in communication with the at least a first cable through the first and second covers;

a third fluid conduit substantially identical to the first and second fluid conduits and operatively connected to a brake of the first rail vehicle;

a third coupling substantially identical to the first and second fluid couplings and fixedly connected to the third fluid conduit;

a fourth fluid conduit substantially identical to the first, second, and third fluid conduits and operatively connected to a fluid supply of the second rail vehicle; and, a fourth coupling substantially identical to the first, second, and third fluid couplings, fixedly connected to the fourth fluid conduit, and connectable to the third coupling, wherein, the first and second fluid conduits are spaced apart from the third and fourth fluid conduits by a distance greater than a length of the first, second, third, and fourth fluid conduits; and the first and second fluid conduits are pressurized.

* * * * *

UNITED STATES PATENT AND TRADEMARK OFFICE
CERTIFICATE OF CORRECTION

| | |
|---|---|
| PATENT NO. | : 8,950,784 B2 |
| APPLICATION NO. | : 13/485479 |
| DATED | : February 10, 2015 |
| INVENTOR(S) | : Dale A. Brown |

It is certified that error appears in the above-identified patent and that said Letters Patent is hereby corrected as shown below:

IN THE SPECIFICATION

Column 7, line 35, delete "Industrial Applicability" and insert -- INDUSTRIAL APPLICABILITY --.

Signed and Sealed this
Twenty-ninth Day of December, 2015

Michelle K. Lee
*Director of the United States Patent and Trademark Office*